Figure 1:
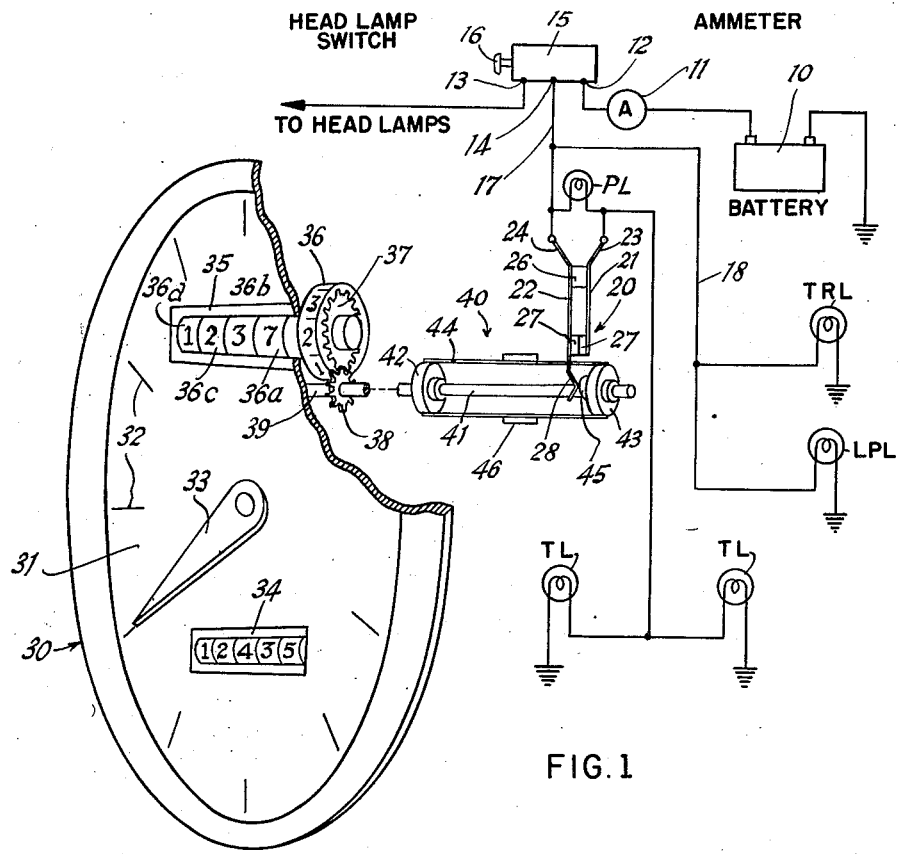

June 25, 1957      J. R. HOLLINS      2,797,404

SAFETY SIGNALLING DEVICE

Filed Jan. 28, 1954

United States Patent Office 2,797,404
Patented June 25, 1957

2,797,404

SAFETY SIGNALLING DEVICE

Jesse R. Hollins, Brooklyn, N. Y.

Application January 28, 1954, Serial No. 406,753

4 Claims. (Cl. 340—264)

This invention relates to automotive safety devices and, more particularly, to a novel signalling arrangement for periodically alerting the driver of a vehicle moving at or above a predetermined speed and the driver of a following vehicle, either or both of whom may be in a state of auto-hypnosis as a result of driving monotony.

Such auto-hypnosis may result, for example, from prolonged, non-interrupted driving over a high speed turnpike, parkway, or thruway, where, due to the monotonous nature of the driving conditions, the driver's attention may be subconsciously fixed on a steady phenomenon such as tire hum, motor hum, a preceding car moving at the same rate of speed, and like conditions. A typical example occurs during night driving on an unlighted highway where, for a long period, a driver's attention and vision may become concentrated on the rear signal lamps, or "tail lamps" of a preceding vehicle.

Such concentration on a relatively fixed object within the driver's normal, straight ahead, line of vision may induce a trance-like state of auto-hypnosis wherein certain normal driving functions are automatically performed subconsciously, but the driver is not alert to suddenly occurring abnormal situations which require conscious driving attention on his part. For example, without the following driver's awareness, the preceding vehicle may decelerate substantially, so that the following driver is "on top" of the car ahead before he is aroused from his subconscious, trance-like state.

To alert periodically the driver of a vehicle moving at or above a predetermined speed, and to alert periodically the driver of a following vehicle, either or both out of a possible subconscious trance, the present invention is directed to a novel arrangement for periodically flashing an indicator lamp in the first driver's normal range of vision and for periodically providing a sharply distinctive change, preferably of short duration, in the aspect of the rear signal lamps of the preceding vehicle. This may be effected by providing a normally closed cam-operated switch in the tail lamp circuit of the vehicle and connecting an electrical signal device, such as an indicator-lamp across the contacts of the switch, and disposed in the driver's range of vision. When the switch is closed, the indicator lamp is shunted by the switch contacts, and the tail lamps are fully illuminated. When the switch is open, the indicator lamp is energized, and the illumination of the tail lamps is reduced proportionately to the resistance of the indicator lamp which is in series wth the tail lamps when the switch is opened. With a high resistance indicator lamp, the tail lamp illumination is reduced below a readily visible value.

To operate the switch at vehicle speeds equalling or exceeding a pre-set value, a "fly ball" governor is connected to be driven by the speedometer or odometer, preferably by the "tenths" wheel of the latter through reduction gearing. A movable element of this governor carries a cam normally out of operative association with the switch. At or above preset vehicle speeds, this governor element moves toward the switch so that its cam periodically and momentarily opens the switch as long as the vehicle speed is at or above such preset value.

The flashing of the indicator lamp alerts the driver of the leading vehicle, and the sudden, periodic change from normal of the rear signal aspect of the leading vehicle will periodically alert the driver of a trailing or following vehicle, as his subconscious instincts will register the abnormal condition of the signal arrangement within his normal line of vision. While a short period of time may be required for the following driver to become fully alert, this is not hazardous as the periodic change in the signal aspect is not accompanied by any decrease in the speed of the preceding vehicle, so that no emergency is thereby created.

For an understanding of the invention principles, reference is made to the following description of a typical embodiment thereof as illustrated in the accompanying drawing.

Figure 2:
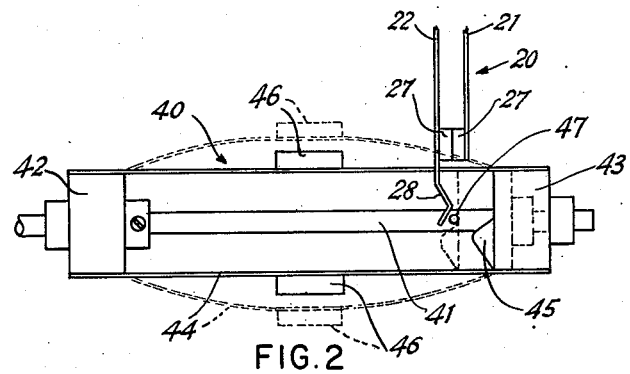

In the drawing:

Fig. 1 is a schematic illustration of a vehicle signalling system embodying the invention; and Fig. 2 is a partial elevation view of the governor and the switch operated thereby.

Referring to the drawings, Fig. 1 illustrates an embodiment of the invention system in which the vehicle tail lamps are momentarily extinguished or dimmed at periodic intervals. In a usual manner, a grounded battery 10, which is usually in parallel with the vehicle generator, is connected through an ammeter 11 to a tap 12 of a headlamp control switch 15. Switch 15, which is provided with an operating handle or knob 16, is of conventional construction, and has a tap 13 connected to the headlamp circuit and a tap 14 connected to the tail lamp and license plate lamp circuits. Other taps (not shown) are provided for connection to the parking lamp circuit and the instrument panel lamp circuit. The headlamps have not been illustrated as they are not involved in the present invention.

A conductor 17 extends from tap 14 and has a branch conductor 18 connected to the grounded license plate lamp or lamps LPL, only one lamp being indicated although more than one is sometimes provided, and to a trunk lamp TRL. For a purpose to be described, conductor 17, which is connected in parallel to the grounded tail lamps TL, has a normally closed switch 20 interposed therein.

The usual vehicle speedometer and odometer is partially illustrated at 30 as including a dial 31 carrying speed indicating indicia 32 over which moves the speed indicator needle 33 operated in the usual manner. In the illustrated arrangement, the speedometer is provided with a totalizing odometer, or mileage indicator 34 and a "trip" odometer 35, with the totalizing odometer registering mile units from 0 to 99,000 and the trip odometer, which is resettable, measuring mile units from 0 to 9900 and including a "tenths" indicating wheel 36. However, many speedometers include only a totalizing odometer having a "tenths" indicating wheel incorporated therewith. It should be understood, therefore, that when reference is made hereinafter to the "tenths" wheel of the odometer, this "tenths" wheel can be part of either a totalizing odometer, or a "trip" odometer, without departing from the invention principles.

The "tenths" wheel 36 is, in the usual manner, provided with a spur gear 37 driven by a pinion 38 connected to the speedometer driving mechanism, as by a shaft 39. In the usual manner, the "units," "tens," "hundreds," and "thousands" wheels of odometer 36, indicated at 36a, 36b, 36c, and 36d, respectively, are geared together with the "tenths" wheel 36 for coordinated operation in registering the "trip" milage. The signal control, and indicator elements so far described, with the exception of normally closed switch 20, are conventional equipment on automotive vehicles.

The switch 20, in the illustrated example, comprises electrically conductive leaf springs 21, 22 secured to a dielectric block 26 and extending in substantially parallel relation therefrom. The rear ends 23, 24 of the strips form terminals secured to the two sections of tail lamp conductor 17. The forward, free portion of each strip carries a contact 27, and these contacts are normally held in engagement by the resilience of strips 21, 22. The free end of strip 22 is extended beyond strip 21 and formed with a V-shape cam follower 28. The illustrated switch 20 is of conventional construction, and may be replaced by any desired type of normally closed switch designed for operation by a cam.

In accordance with the invention, switch 20 is fixedly mounted in or immediately adjacent the speedometer housing and in a position wherein its cam follower 28 may be operatively engaged by a cam 45, of dielectric material, mounted on a "flyball" type governor 40 driven by the tenths mechanism of speedometer 30. For this purpose, spur gear 38 is connected to a shaft 41 which may be rotatably mounted in suitable bearings (not shown) in the speedometer housing. To attain an effective angular velocity for governor 40, the connection of gear 38 to shaft 41 may be made through step-up reduction gearing.

Governor 40 includes a dielectric disk 42 fixed to rotate with shaft 41 and fixed axially of the latter, and a dielectric disk 43 carrying cam 45. Disk 43 is fixed to rotate with shaft 41 but is axially movable therealong. Relatively light springs 44, 44 interconnect disks 42 and 43 and have masses 46 affixed thereto intermediate their ends. Cam 45 is on the inner side of disk 43 and is normally spaced axially outwardly of the cam portion 28 of switch 20.

When the vehicle speed equals or exceeds a preset value, masses 46 fly outwardly, under the influence of centrifugal force, an amount sufficient to pull disk 43 toward disk 42 and engage cam 45 with switch end 28. A pin 47 on shaft 41 limits further inward movement of disk 43.

The operation of the arrangement is as follows. When headlamp switch 15 is operated to connect conductor 17 to battery 10, lamps TL, LPL, and TRL are illuminated, assuming switch 20 is closed, and indicator lamp PL, which is connected across arms 21, 22 of switch 20, is extinguished as it is shunted by contacts 27. When the vehicle speed is sufficient for cam 45 to engage switch portion 28, switch arm 22 is moved away from arm 21 a pre-set number of times during each revolution of tenths wheel 36. Each time switch 20 is thus opened, indicator lamp PL is connected in series with tail lamps TL, and is thus momentarily flashed. At the same instant, the illumination of lamps TL is reduced due to the resistance of lamp PL. If this resistance is sufficiently high, lamps TL are extinguished for all practical purposes. License plate lamp LPL remains steadily illuminated and the circuit to trunk lamp TRL remains unaffected.

The flashing lamp PL, located in the driver's line of vision periodically alerts the driver. The rear signal aspect of the vehicle momentarily changes from normal to abnormal periodically, even though there is no reduction in the rate of movement of the vehicle. This periodic change of the signal aspect in the field of vision of a following driver will alert the latter if he should be in the afore-mentioned subconscious, trance-like state.

While a specific embodiment of the invention has been shown and described in detail to illustrate the application of the invention principles, it will be understood that the invention may be embodied otherwise without departing from such principles.

What is claimed is:

1. In an automotive vehicle having rear mounted signal lamp means, an odometer and switch means selectively operable to close an energizing circuit to steadily illuminate said signal lamp means to provide a normal signal aspect to a following vehicle, the combination therewith of a normally closed cam operated switch connected in series in said energizing circuit, an electrically resistive signal device connected in shunt with said switch and within the driver's range of vision; and a rotatable speed responsive device driven from said odometer and including a cam normally out of operative relation with said switch and movable into operative relation therewith, responsive to motion of the vehicle at speeds above a preset value, to periodically and momentarily open said switch, to connect said signal device in series with said signal lamp means to energize said signal device and reduce the illumination of said signal lamp means.

2. In an automotive vehicle having rear mounted signal lamp means, an odometer and switch means selectively operable to close an energizing circuit to steadily illuminate said signal lamp means to provide a normal signal aspect to a following vehicle, the combination therewith of a normally closed cam operated switch connected in series in said energizing circuit, an indicator lamp on the vehicle connected in shunt with said switch and within the driver's range of vision; and a rotatable speed responsive device driven from said odometer and including a cam normally out of operative relation with said switch and movable into operative relation therewith, responsive to motion of the vehicle at speeds above a pre-set value, to periodically and momentarily open said switch.

3. In an automotive vehicle having rear mounted signal lamp means, an odometer and switch means selectively operable to close an energizing circuit to steadily illuminate said signal lamp means to provide a normal signal aspect to a following vehicle, the combination therewith of a normally closed cam operated switch connected in series in said energizing circuit, a signal device on the vehicle within the driver's range of vision; and a rotatable speed responsive device driven from said odometer and including a cam normally out of operative relation with said switch and movable into operative relation therewith, responsive to motion of the vehicle at speeds above a pre-set value, to periodically and momentarily open said switch, to connect said signal device in series with said signal lamp means to energize said signal device and reduce the illumination of said signal lamp means.

4. In an automotive vehicle having rear mounted signal lamp means, an odometer and switch means selectively operable to close an energizing circuit to steadily illuminate said signal lamp means to provide a normal signal aspect to a following vehicle, the combination therewith of a normally closed cam operated switch connected in series in said energizing circuit, a high resistance signal device on the vehicle within the driver's range of vision; and a rotatable speed responsive device driven from said odometer and including a cam normally out of operative relation with said switch and movable into operative relation therewith, responsive to motion of the vehicle at speeds above a pre-set value, to periodically and momentarily open said switch to connect said signal device in series with said signal lamp means to energize said signal device and reduce the illumination of said signal lamp means.

References Cited in the file of this patent
UNITED STATES PATENTS

| | | |
|---|---|---|
| 1,508,884 | Jacobs | Sept. 16, 1924 |
| 1,543,704 | Evelyn | June 30, 1925 |
| 1,651,708 | Johansen | Dec. 6, 1927 |
| 1,723,222 | Wattells | Aug. 6, 1929 |
| 1,980,037 | Chase | Nov. 6, 1934 |
| 2,276,787 | Moore | Mar. 17, 1942 |